United States Patent [19]

Gagnebin

[11] 4,412,704

[45] Nov. 1, 1983

[54] COUPLING MECHANISM

[75] Inventor: Gustave Gagnebin, Yverdon, Switzerland

[73] Assignee: Hermes Precisa International S.A., Yverdon, Switzerland

[21] Appl. No.: 260,804

[22] Filed: May 5, 1981

[30] Foreign Application Priority Data

May 20, 1980 [CH] Switzerland .......................... 3915/80

[51] Int. Cl.$^3$ ............................................ F16C 29/12
[52] U.S. Cl. .................................. 308/6 R; 308/3 R; 400/328; 400/354.1
[58] Field of Search .............. 308/2 R, 6 R, 3 R, 3 A; 403/79, 80, 52, 59; 464/106, 112, 162, 167, 168, 169, 166; 400/320, 328, 354, 354.1; 346/141

[56] References Cited

U.S. PATENT DOCUMENTS

| | | | |
|---|---|---|---|
| 2,526,341 | 10/1950 | Forkey | 464/167 |
| 2,876,280 | 3/1959 | Griffith | 400/320 X |
| 3,034,125 | 5/1962 | Gonzenbach | 346/79 |
| 3,375,045 | 3/1968 | Zeidler | 308/6 R |
| 3,659,909 | 5/1972 | Egbert | 464/167 X |
| 3,924,725 | 12/1975 | Kuhn et al. | 400/328 X |

Primary Examiner—Stuart S. Levy
Assistant Examiner—Thomas R. Hannon
Attorney, Agent, or Firm—Emory L. Groff, Jr.

[57] ABSTRACT

A pivotal rod, in the form of a flat bar, extends through an axial bore of a sleeve, pivotally mounted on a sliding carriage. A coupling member connecting the rod to the sleeve comprises a slide pivoted on the sleeve around a pivotal axis perpendicular to the axis of rotation of the sleeve and sliding along the rod. The coupling member includes three ball bearings, two of which bear on the edges of one of the surfaces of the flat bar and the third bears against the other surface in the longitudinal axis of the flat bar. The bearings are mounted on pivots oriented parallel to the pivotal axis of the coupling member. This mechanism ensures an angular coupling without play between the rod and the sleeve and is usable even when the displacement of the rod or the trajectory of the carriage or their parallelism to each other is not perfect.

8 Claims, 6 Drawing Figures

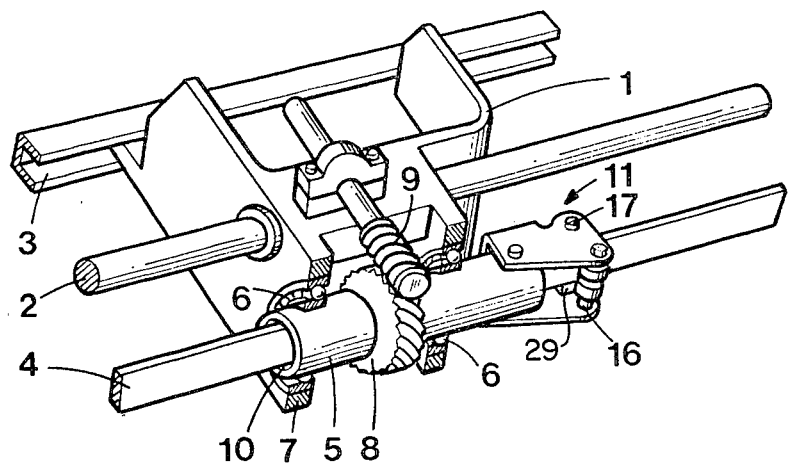
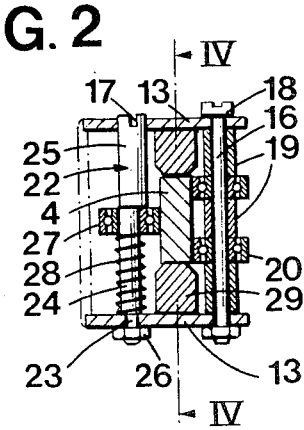
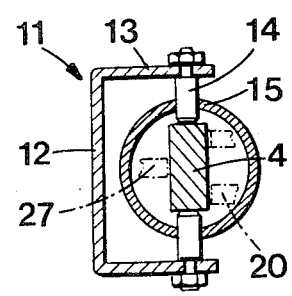
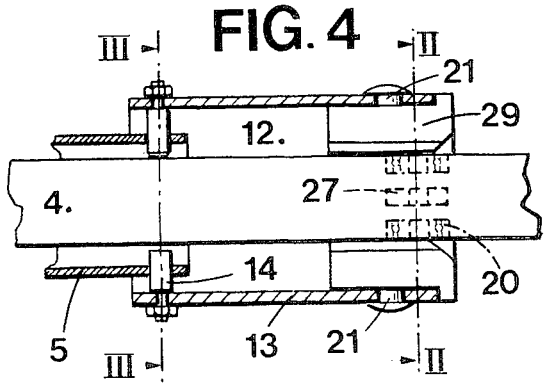

FIG. 5
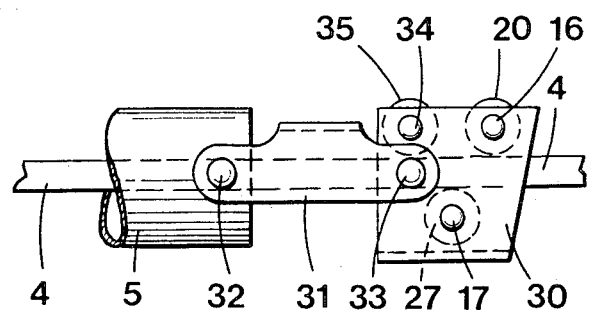
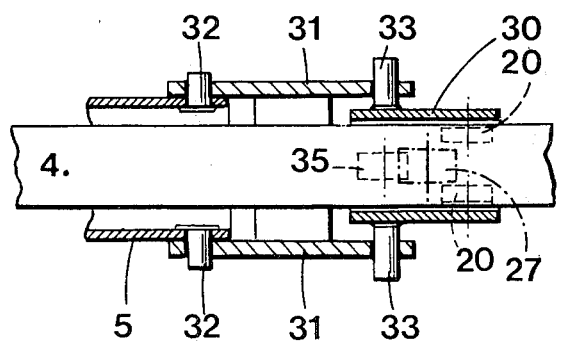
FIG. 6

COUPLING MECHANISM

The present invention concerns an angular coupling mechanism between a rotating part displaceable along its axis of rotation and a rod pivotal about its longitudinal axis and extending through an axial chamber of the rotating part.

Coupling mechanisms of this type are found in numerous constructions, especially in machine tools, in printing machines or typewriters. In these machines there is generally concerned driving a device carried by a carriage sliding along a rectilinear trajectory by means of a driving bar pivoting about an axis parallel to the trajectory and extending through a sleeve disposed on the carriage; the rotational movement of the sleeve, constituting the rotating part, being subsequently transmitted to the driving device.

It is known to provide a cylindrical driving bar engaged in a corresponding bore of the sleeve, the bar presenting a longitudinal throat co-operating with a coupling pin secured to the sleeve and projecting into this bore.

It is necessary to make each part with great precision so that the angular play between the bar and the sleeve is not very great. It is on the other hand practically impossible to avoid this play entirely without introducing large frictional forces between the sleeve and the bar. Moreover, to ensure correct functioning of the mechanism, the trajectory of the carriage must be perfectly rectilinear, the driving bar must be straight and its axis of rotation parallel to the trajectory of the carriage. There results in that the cost of this type of mechanism is very high, even though it does not permit obtaining an angular coupling without play between the bar and the sleeve.

It is an object of the invention to provide a cheap coupling mechanism in which the angular play between the rod and the rotating part is negligible, if not nil.

According to the present invention there is provided a coupling mechanism between a rotatable part displaceable along its axis of rotation and a rod pivotal about its longitudinal axis and extending through an axial passage of the rotatable part, comprising an angular coupling member between the part and the rod, said coupling member being pivotably mounted on the rotatable part about a pivotal axis at right angles to the axis of rotation of the rotatable part and presenting a part slidingly mounted on the rod and angularly secured with this latter, the whole being disposed in a manner to permit a relative axial displacement between the rod and the rotatable part following a direction substantially parallel to the pivotal axis.

The invention will be described further, by way of example, with reference to the accompanying drawings, in which:

FIG. 1 is a partial perspective view of an angular coupling mechanism;

FIGS. 2 and 3 are cross-sectional views of the coupling member of FIG. 1;

FIG. 4 is a section along the line IV—IV of FIG. 2; and

FIGS. 5 and 6 are respectively a view from above and a view in longitudinal of an alternative embodiment of the invention.

With reference to FIGS. 1 to 4, a carriage 1 is slidingly mounted along two parallel profiled sections or members 2 and 3. The carriage 1 carries a rotary part 5 constituted by a sleeve, which is traversed by a pivotal rod 4. The longitudinal axis of the pivotal rod 4 is substantially parallel to the members 2 and 3. The sleeve 5 is mounted in two ball bearings 6, housed in bearings 7 of the carriage and carries a helicoidal pinion 8 in mesh with a helicoidal pinion 9 of an actuating shaft of a device (not shown).

The sleeve 5 presents an axial bore 10 through which passes the rod 4. This bore 10 is of larger diameter than the dimensions of the rod 4, so that the rod 4 can be slightly offset with respect to the axis of rotation of the sleeve 5 without coming into contact with the sleeve 5. The rod 4 is constituted by a flat bar of constant section.

The angular coupling between the sleeve 5 and the rod 4 is effected by a coupling member 11 pivotally mounted at one of the ends of the sleeve 5 and having at its free end two pivots 16, 17, provided for sliding on the rod 4.

This coupling member 11 comprises a part 12 of generally U-shaped folded sheet metal having two arms 13 which each carry a pivot pin 14. These pins 14 are screwed and bolted to the arms and disposed coaxially. The pins 14 are engaged in diametrically opposed bores of the sleeve 5.

The two pivots 16, 17, are mounted between the two arms 13 of the part 12, parallel to the common axis of the two pins 14. One of these pivots 16 comprises two ball bearings 20 mounted on a threaded member or screw 18, tightened and secured by means of a nut, and maintained at a distance from the arms 13 and spaced apart from each other by spacers 19. The other pivot 17 is constituted by a screw 22 without a head and whose shank comprises three longitudinal portions 23, 24, 25, of differing diameters. The threaded portion 23, of smaller diameter, crosses through one arm 13 and is tightened and secured by means of a nut 26. The largest diameter portion 25, provided at the other end of the screw, extends through a bore in the other arm. The intermediate portion 24 is eccentric with respect to the others and carries a ball bearing 27 maintained in abutment against the end of the portion 25 by a spring 28. Two synthetic material slides or guides 29 are fixed to the surfaces of the arm 13 facing each other. Each guide 29 has a stud 21 which is engaged in a corresponding hole in the arm 13 and which is rivetted or secured to the part 12 by ultra sonics or heat bonded or set.

The rod 4 is engaged between the bearings 20, 27, of the two pivots 16, 17, and between the two guides 29. The distance between said guides is substantially equal to the width of the rod 4. The position of the bearing 27 is adjusted in such a manner that it urges the rod 4 against the two bearings 20. The two bearings 20 co-operate with the longitudinal edges of one of the surfaces of the flat bar constituting the rod 4 whilst the bearing 27 bears against the other surface of the flat bar, along its longitudinal axis. This arrangement of the bearings 20, 27, ensures a coupling of the rod 4 to the part 12 without play and the rotational movements of the rod 4 are transmitted to this part 12 via pivots 16, 17.

As shown in FIG. 3, the rod 4 passes with play between the ends of the pins 14. Each pin 14 can slide in the corresponding bore 15 of the sleeve 5 and is longer than the play of the rod 4 in the sleeve 5, increased by the thickness of the wall of the sleeve 5.

The play of the rod 4 between the guides 29 is low so that, when the rod 4 effects a transverse displacement, parallel to the orientation of the pivots 16, 17, it drives the part 12 via the guides 29 and causes the pins 14 to slide in their bore 15.

The angular coupling of the part 12 to the sleeve 5 is ensured by the pins 14, and a sliding of said pins in the bores 15 does not alter the angular position of the sleeve 5 with respect of the rod 4. When the rod 4 undergoes a transverse displacement with respect to the sleeve 5, perpendicularly to the pivots 16, 17, the part 12 pivots around the pins 14 without the angular position of the rod 4 with respect to the sleeve 5 being altered.

It is to be noted that the coupling mechanism described above permits an angular connection of the rod 4 to the sleeve 5 practically without play, even though this rod 4 can be displaced transversely to the inside of the bore 10 of the sleeve 5.

Such an angular coupling mechanism can be used without inconvenience when the trajectory of the carriage 1 is not perfectly rectilinear or when the pivotal axis of the rod 4 is not perfectly parallel to the said trajectory.

FIGS. 5 and 6 illustrate an alternative embodiment of the coupling member 11 which latter is constituted by a pair of parallel links 31. One end of each of the links 31 is pivotally mounted on a pin 32 secured to the sleeve 5, whilst the other end of each link 31 is pivotally mounted on a pivot 33 secured to slide 30. The two links 31 are connected to each other in a manner to avoid torsional effects with respect to the pins 32 and to the pivots 33. They are in effect made from one piece by folding of a piece of sheet metal cut in the form of an H. The slide 30 can be displaced with respect to the links along its pivots 33. The slide 30 presents on the one hand two pivots 16 and 34 respectively carrying two bearings 20 and a bearing 35, thus defining a bearing plane, and on the other hand a pivot 17 with eccentric portion as previously described and carrying a bearing 27 adapted to urge the rod 4 against the bearings 20 and 35. Preferably, the bearing 27 operates substantially in the centre of gravity of the triangle defined by the bearing points of the three bearings 20, 35, against the flat bar 4.

This construction gives an improved freedom of movement to the rod 4 with respect to the sleeve 5, but is more expensive and less robust than the first embodiment described.

One can of course, conceive other modifications and variations of coupling mechanisms. The slide 30 could, for example, be pivoted to the sleeve by two pairs of links 31 disposed symmetrically with respect to the longitudinal axis of the rod 4 and constituting a deformable parallelogram. In a general manner, the connecting member 11 can be constituted by a slide slidingly mounted along the rod 4 and angularly solid with or secured to this latter, and presenting at least a pair of parallel arms of which at least the free ends thereof are pivoted on the sleeve 5 along an axis perpendicular to the axis of rotation of this latter.

I claim:

1. A coupling mechanism between a rotatable part which is displaceable along its axis of rotation and a rod pivotal about its longitudinal axis and extending through an axial passage of the rotatable part, comprising an angular coupling member between the part and the rod, said coupling member being pivotally mounted on the rotatable part about a pivotal axis at right angles to the axis of rotation of the rotatable part and including a part slidingly mounted on the rod and angularly secured with said rod, said coupling member, rotatable part and rod being disposed in such a manner to permit a relative displacement between said rod and said rotatable part following a direction substantially parallel to the pivotal axis.

2. A mechanism as claimed in claim 1, in which the angular coupling member comprises a slide mounted around said rod, said slide including a pair of arms having free ends, said free ends pivoted on said rotatable part and on each side of its axis of rotation.

3. A mechanism as claimed in claim 2, in which said rod comprises a flat bar of constant section having longitudinally extending edges and oppositely disposed side surfaces, said rod guided without play in the slide between three guide members, two of said guide members bearing against the flat bar along two spaced apart regions of one of its side surfaces adjacent said edges, the third member bearing against the other side surface substantially half way between said edges of said flat bar.

4. A mechanism as claimed in claim 3, in which said guide members are ball bearings mounted on pivots orientated parallel to the pivotal axis, the pivot carrying the third ball bearing comprising a three part screw including an eccentric portion on which said third ball bearing is mounted, whereby rotation of said screw adjusts the position of said third ball bearing to suppress the play of said rod between said guide members.

5. A mechanism as claimed in claim 4, in which said pivots are disposed in a plane substantially perpendicular to the longitudinal axis of the flat bar.

6. A mechanism as claimed in claim 4, in which the arms pivoted on the rotatable part are likewise pivoted on the slide along an axis parallel to the pivotal axis of the rotatable part, the slide presenting a supplementary guide bearing operating on the same surface of the flat bar as the first two bearings, the third bearing bearing on the other surface being substantially at the centre of gravity of the triangle determined by the three bearing points of the other bearings.

7. A mechanism as claimed in claim 6, in which the slide is pivoted to the rotatable part via two pairs of arms forming deformable parallelograms.

8. A mechanism as claimed in claim 2, wherein said slide is displaceable on said rotatable part parallel to its pivotal axis.

* * * * *